Mar. 27, 1923.

W. P. LOUDON 1,449,825

STORAGE BATTERY CONSTRUCTION

Filed Apr. 18, 1918

WITNESS:

INVENTOR.
Warren P. Loudon.
BY

ATTORNEY.

Patented Mar. 27, 1923.

1,449,825

UNITED STATES PATENT OFFICE.

WARREN P. LOUDON, OF NIAGARA FALLS, NEW YORK, ASSIGNOR TO U. S. LIGHT & HEAT CORPORATION, OF NIAGARA FALLS, NEW YORK, A CORPORATION OF NEW YORK.

STORAGE-BATTERY CONSTRUCTION.

Application filed April 18, 1918. Serial No. 229,274.

*To all whom it may concern:*

Be it known that I, WARREN P. LOUDON, a citizen of the United States, residing at Niagara Falls, in the county of Niagara and State of New York, have invented new and useful Improvements in Storage - Battery Constructions, of which the following is a specification.

The present invention relates to storage battery construction.

There are a great number of storage batteries in use at the present time in which no effective means is provided for preventing the escape of electrolyte along the cell posts. Due to the vibration of the active elements within the cell, there is a steady creepage of electrolyte along the cell posts, resulting in a collection of electrolyte on the outside of the cell, which often produces short circuits and does other damage.

The present invention has for one of its objects the provision of means which may be applied to storage battery constructions whereby to prevent the escape of the electrolyte as above described.

A further object is to provide means of the character referred to which are simple to manufacture and which may be applied to existing batteries without the exercise of any great amount of mechanical skill.

Further objects will be apparent as the description proceeds.

Referring to the drawings—

Figure 1:
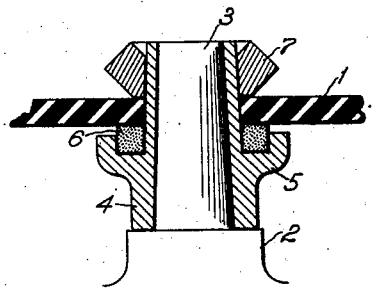
Fig. 1 represents one embodiment of the present invention.

The numeral 1 indicates a part of a storage battery cell. Said part 1 may be one of the walls or may be the cover of the cell. In this specification and in the claims forming part of the same, the part 1 is referred to as the wall. This term is to be broadly construed to include the cover as well as the side walls of a storage battery cell. The numeral 2 represents a strap which is ordinarily provided to connect plates of the same polarity within the storage battery cell. Said strap 2 is provided with a cell post 3. The cell post 3 is ordinarily round in cross section though the present invention is applicable to cell posts of any other cross-section. The cell post 3, as illustrated in Fig. 1, is provided with an adapter 4 which surrounds the post 3, extending through the wall 1 and resting upon the strap 2.

The adapter 4 has for its function the provision of means for sealing the cell to prevent the creepage of electrolyte from the cell. The adapter 4 may assume various forms. As illustrated, it is provided with an annular shoulder 5 which supports an annular gasket 6. The gasket 6 is adapted to lie in a compressed condition between the shoulder 5 and the wall 1. Means will be provided for holding said gasket 6 in a compressed condition. Various means which may be used for this purpose are illustrated and described in an application of Campbell C. Carpenter, Serial No. 216,144, filed February 9, 1918. In the embodiment illustrated in Fig. 1 hereof, an ordinary connecting link is used for holding the gasket 6 in its compressed condition. Such a link is indicated by the numeral 7. It will be obvious, without detailed explanation, that when the operator is mounting the link 7 upon the adapter 4, he will press downwardly upon the link 7 and will burn the link 7, adapter 4 and post 3 together, whereby to integrally unite said members.

It will be obvious that the construction illustrated in Fig. 1 will effectually prevent the escape of electrolyte. No electrolyte can escape between the post 3 and adapter 4, inasmuch as said members are integrally united as described above. No electrolyte can escape between the gasket 6 and the wall 1, inasmuch as said gasket 6 is held in a compressed condition against the wall 1 and forms an effective seal therewith. The adapters may be constructed at small expense and are readily applicable to a great number of storage batteries now in use.

Figure 2:
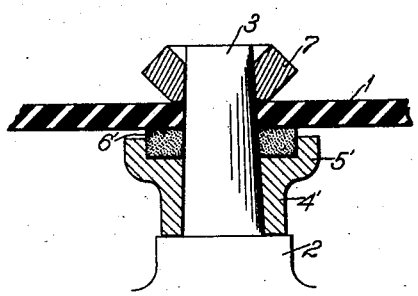
Fig. 2 represents a modification.

In the embodiment of the present invention illustrated in Fig. 2, the adapter does not extend through the wall 1. In Fig. 2, the adapter is indicated by the numeral 4'. In said figure the adapter 4' is provided with an annular shoulder 5', which is adapted to support a gasket 6'. The gasket 6' is adapted to have intimate contact with the wall 1 and the post 3. As in the embodiment illustrated in Fig. 1, the gasket is held in compressed condition by the link 7, though any other preferred holding means may be used, if desired.

It will be obvious that the construction illustrated in Fig. 2 will effectually prevent the escape of electrolyte, inasmuch as no electrolyte may creep along the post, for the reason that the gasket 6' forms an effective seal therewith. For the same reason, no electrolyte can creep between the gasket 6' and the wall 1.

The described embodiments of the present invention are chosen merely for the purpose of illustration and should not be interpreted in a limiting sense. Many modifications will occur to those skilled in the art. It is intended in this patent to cover all such modifications that come within the scope of the present invention as defined by the appended claims.

What I claim as new and desire to secure by Letters Patent of the United States is—

1. In a battery cell having a wall and a cell post extending therethrough, an adapter fitting over and supported by said cell post independently of said wall, and means carried by said adapter for preventing the escape of liquid through said wall adjacent to said post.

2. In a battery cell having a wall and a cell post extending therethrough, an adapter fitting over and supported by said cell post independently of said wall, and an annular compressible gasket surrounding and supported by said adapter for preventing the escape of liquid through said wall adjacent to said post.

3. In a battery cell having a wall and a cell post extending therethrough, an adapter fitting over and supported by said cell post independently of said wall, said adapter having an annular shoulder adapted to support a sealing means for said cell.

In witness whereof, I have hereunto subscribed my name.

WARREN P. LOUDON.